United States Patent
Suemura et al.

(10) Patent No.: US 9,969,867 B2
(45) Date of Patent: May 15, 2018

(54) SILICA SOL AND SILICA-CONTAINING EPOXY RESIN COMPOSITION

(71) Applicant: NISSAN CHEMICAL INDUSTRIES, LTD., Tokyo (JP)

(72) Inventors: Naohiko Suemura, Sodegaura (JP); Megumi Shimada, Sodegaura (JP); Ichitaro Kikunaga, Sodegaura (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 245 days.

(21) Appl. No.: 14/785,739

(22) PCT Filed: May 14, 2014

(86) PCT No.: PCT/JP2014/062893
§ 371 (c)(1),
(2) Date: Oct. 20, 2015

(87) PCT Pub. No.: WO2014/188934
PCT Pub. Date: Nov. 27, 2014

(65) Prior Publication Data
US 2016/0068664 A1    Mar. 10, 2016

(30) Foreign Application Priority Data

May 20, 2013   (JP) ................ 2013-106394

(51) Int. Cl.

| | | |
|---|---|---|
| *C08G 59/18* | (2006.01) | |
| *C08L 63/00* | (2006.01) | |
| *C08K 3/36* | (2006.01) | |
| *C08K 9/06* | (2006.01) | |
| *C01B 33/14* | (2006.01) | |
| *C01B 33/141* | (2006.01) | |
| *C01B 33/142* | (2006.01) | |
| *C01B 33/143* | (2006.01) | |
| *C01B 33/146* | (2006.01) | |
| *C01B 33/149* | (2006.01) | |
| *C01B 33/12* | (2006.01) | |
| *C01B 33/148* | (2006.01) | |
| *C01B 33/152* | (2006.01) | |

(52) U.S. Cl.
CPC .............. *C08K 9/06* (2013.01); *C01B 33/128* (2013.01); *C01B 33/142* (2013.01); *C01B 33/146* (2013.01); *C01B 33/148* (2013.01); *C01B 33/152* (2013.01); *C08K 3/36* (2013.01)

(58) Field of Classification Search
None
See application file for complete search history.

(56) References Cited

U.S. PATENT DOCUMENTS

2010/0071272 A1 *  3/2010  Higuchi ................ C01B 33/141
                                                                    51/308
2011/0040031 A1    2/2011  Langerbeins et al.
2014/0042359 A1    2/2014  Fuhrmann et al.

FOREIGN PATENT DOCUMENTS

| JP | 2011-213514 A | 10/2011 |
| JP | 2013-126925 A | 6/2013 |
| WO | 2012/113650 A2 | 8/2012 |

OTHER PUBLICATIONS

Dec. 1, 2016 Extended Search Report issued in European Patent Application No. 14801890.6.
Aug. 19, 2014 Search Report issued in International Patent Application No. PCT/JP2014/062893.

* cited by examiner

*Primary Examiner* — Michael J Feely
(74) *Attorney, Agent, or Firm* — Oliff PLC

(57) ABSTRACT

The silica sol of the invention contains silica particles having a mean primary particle size of 20 to 100 nm and which has a silica particle size/mean primary particle size ratio, determined through dynamic light scattering, of 3.0 or less, wherein the silica particles are surface-treated with an organic silane compound and have an α-ray emission rate of 0.005 counts/cm$^2$·hr or less and a moisture absorption coefficient, determined after allowing the silica particles to stand for 48 hours at 23° C. and a relative humidity of 50 RH %, of 0.5 mass % or lower.

19 Claims, No Drawings

SILICA SOL AND SILICA-CONTAINING EPOXY RESIN COMPOSITION

TECHNICAL FIELD

The present invention relates to a sol of nano-size silica particles which have a considerably low α-ray emission rate and a small coefficient of moisture absorption (hereinafter referred to as "moisture absorption coefficient"), and to an epoxy resin composition and a cured product thereof each containing the silica particles.

BACKGROUND ART

Silica sol is a colloid solution formed of a dispersion medium and silica particles having a particle size of about 3 to about 100 nm dispersed in the medium, and has high transparency. By virtue of high hardness and heat resistance, such a particulate silica is employed as a resin modifier which is incorporated into resin or a similar material so as to enhance hardness and heat resistance of the resin.

Upon incorporation of silica sol into resin, a silica sol containing an organic solvent or a resin monomer as a dispersion medium is usually used, in consideration of compatibility and reactivity of the sol with the target resin or curing agent. In some cases, surface-hydrophobicized silica powder is employed.

Generally, resins for use in wiring substrates for semiconductor packages and in semiconductor sealing materials contain a silica filler, in order to reduce the linear expansion coefficient of the resins. Conventionally, a micron-size silica filler has been employed for such uses. In recent years, as the pattern pitch of semiconductor elements and the thickness of wiring substrates are reduced, resins for such uses must have lower linear expansion coefficient. Thus, extensive studies have been conducted for increasing the silica filler/resin charge ratio.

When a micro-size filler is incorporated into a resin at high charging ratio, in some cases, the resultant resin composition has reduced flowability to have impaired handling property. When surface-treated, nano-size silica particles are incorporated into such a resin, the flowability of the silica filler-containing resin composition is enhanced (Patent Document 1).

However, since nano-size silica particles have large surface area, the degree of moisture absorption thereof is higher than that of micron-size silica particles, which is problematic. When a highly moisture-absorbing silica filler is incorporated into a resin, the cured resin becomes highly moisture-absorbing, resulting in impairment in insulation performance and mechanical strength. That is, device reliability is impaired. Therefore, low moisture-absorbing property is required for nano-size silica particles.

Meanwhile, in automated semiconductor production steps, the position of each device must be detected automatically. Thus, a semiconductor sealing material or adhesive, in particular a sealing resin, is required to have high transparency. Such a sealing resin is also required to have low linear expansion coefficient, and there is demand for nano-size silica particles which can be incorporated into a sealing epoxy resin at high charging ratio.

In addition, the silica filler for the aforementioned such electronic material uses is desired to have a very small radioactive element (e.g., uranium or thorium) content, since α-ray emitted by radioactive elements (e.g., uranium and thorium) may cause mulfunctions of semiconductor devices.

Generally speaking, silica sol is produced from sodium silicate as a raw material or from silicon alkoxide as a raw material. When produced from sodium silicate as a raw material, the produced silica sol contains large amounts of radioactive elements (e.g., uranium and thorium). Among the radioactive elements, thorium is difficult to remove even through ion exchange of sodium silicate. Thus, difficulty is encountered in application, to the aforementioned electronic material uses, of a silica sol produced from readily available sodium silicate as a raw material.

In contrast, silicon alkoxide is a raw material which has high silicon alkoxide purity. Thus, silicon alkoxide can readily provide a silica sol having a low level of radioactive elements in colloidal silica, which is advantageous. However, no satisfactorily low-moisture-absorbing silica particles have ever been produced, and application of moisture-absorbing silica particles to the aforementioned electronic material uses problematically causes impairment in device performance.

Several nano-size silica fillers are commercially available, and examples include fumed silica powder and molten method silica powder. These commercial products advantageously have low moisture-absorbing property, but have considerably poor resin dispersion property. Thus, problems such as stickiness of resin varnish occur, thereby failing to attain high charging ratio.

PRIOR ART DOCUMENTS

Patent Documents

[Patent Document 1] Japanese Patent Application Laid-Open (kokai) No. 2011-213514

SUMMARY OF THE INVENTION

Problems to be Solved by the Invention

An object of the present invention for solving the aforementioned problems is to provide a silica sol containing nano-size silica particles which can be readily incorporated into a resin employed in wiring substrates for semiconductor packages and semiconductor sealing materials, and which has a very low α-ray emission rate and a small moisture absorption coefficient. Another object is to provide a resin composition containing the silica sol.

Means for Solving the Problems

The present inventors have conducted extensive studies, and have found a silica sol containing nano-size silica particles which have a considerably low α-ray emission rate and a small moisture absorption coefficient.

In a first mode of the present invention, there is provided a silica sol which contains silica particles having a mean primary particle size of 20 to 100 nm and which has a silica particle size/mean primary particle size ratio, determined through dynamic light scattering, of 3.0 or less, wherein the silica particles are surface-treated with an organic silane compound and have an α-ray emission rate of 0.005 counts/$cm^2 \cdot hr$ or less and a moisture absorption coefficient, determined after allowing the silica particles to stand for 48 hours at 23° C. and a relative humidity of 50 RH %, of 0.5 mass % or lower.

A second mode is directed to a specific embodiment of the silica sol of the first mode, wherein the organic silane compound has an epoxy group.

A third mode is directed to a specific embodiment of the silica sol of the first or second mode, wherein the silica particles have been heated in water at 200 to 350° C.

A fourth mode is directed to a specific embodiment of the silica sol of any one of the first to third modes, wherein the silica particles are produced from an active silicic acid as a starting material which is prepared through cation exchange of aqueous alkali silicate.

A fifth mode is directed to a specific embodiment of the silica sol of any one of the first to third modes, wherein the silica particles are produced from a high-purity active silicic acid as a starting material, the high-purity active silicic acid being prepared by adding a strong acid to an active silicic acid which has been prepared through cation exchange of aqueous alkali silicate, and subjecting the product to cation exchange and anion exchange.

A sixth mode is directed to a specific embodiment of the silica sol of any one of the first to third modes, wherein the silica particles are produced from a high-purity active silicic acid as a starting material, the high-purity active silicic acid being prepared by adding a strong acid or a strong acid salt to aqueous alkali silicate, subjecting the product to cation exchange to thereby form an active silicic acid, and subjecting the active silicic acid to cation exchange and anion exchange.

A seventh mode is directed to a specific embodiment of the silica sol of any one of the first to sixth modes, wherein the dispersion medium is an organic solvent.

An eighth mode is directed to a specific embodiment of the silica sol of any one of the first to sixth modes, wherein the dispersion medium is a resin monomer.

A ninth mode is directed to a specific embodiment of the silica sol of the eighth mode, wherein the resin monomer is an epoxy resin monomer.

In a tenth mode of the present invention, there is provided a silica powder which is produced by removing the dispersion medium from a silica sol as recited in any one of the first to ninth modes.

In an eleventh mode of the present invention, there is provided a silica-containing epoxy resin composition comprising a silica sol as recited in any one of the first to ninth modes or a silica powder as recited in the tenth mode, an epoxy resin monomer, and an epoxy resin-curing agent.

In a twelfth mode of the present invention, there is provided a silica-containing epoxy resin composition which is a silica-containing epoxy resin composition as recited in the eleventh mode from which the organic solvent has been removed.

A thirteenth mode is directed to a specific embodiment of a silica-containing epoxy resin composition of the eleventh or twelfth mode, which has a silica content of 10 to 90 mass %.

In a fourteenth mode of the present invention, there is provided a silica-containing epoxy resin cured product which is produced by curing a silica-containing epoxy resin composition as recited in any one of the eleventh to thirteenth modes.

Effects of the Invention

The silica sol of the present invention contains nano-size silica particles having a very low α-ray emission rate and a small moisture absorption coefficient. When the silica sol of the invention is incorporated into a resin employed in wiring substrate for semiconductor packages and semiconductor sealing materials, a resin product having low linear expansion coefficient can be produced.

MODES FOR CARRYING OUT THE INVENTION

The silica sol of the present invention will next be described in detail. The silica sol of the present invention contains silica particles having a mean primary particle size of 20 to 100 nm and has a silica particle size/mean primary particle size ratio, determined through dynamic light scattering, of 3.0 or less, wherein the silica particles are surface-treated with an organic silane compound and have an α-ray emission rate of 0.005 counts/cm$^2$·hr or less and a moisture absorption coefficient, determined after allowing the silica particles to stand for 48 hours at 23° C. and a relative humidity of 50 RH %, of 0.5 mass %, or lower.

The α-ray emission rate of silica particles may be determined by use of dry powder of silica particles by means of a 2π gas flow counting low level α-ray measuring device, for example, LACS-4000M (product of Sumitomo Chemical Industries, Co., Ltd.).

In the present invention, the moisture absorption coefficient, after allowing the silica particles to stand for 48 hours at 23° C. and a relative humidity of 50 RH %, may be determined by measuring the change in weight of dried silica powder after the powder has been allowed to stand for 48 hours and a relative humidity of 50 RH %. Specifically, a silica sol is dried at 80° C. in a vacuum drier, to thereby form a corresponding silica gel, and the gel is pulverized with a mortar. The thus-obtained powder is further dried at 180° C. for 3 hours, to thereby yield a dry silica powder. Then, an aliquot (0.2 g) of the dry silica powder is taken into a weighing bottle for weight measurement. Firstly, while the weighing bottle remains opened, the powder is allowed to stand for 48 hours at 23° C. and a relative humidity of 50 RH %. Then, the bottle is closed by the cap, and the weight of the powder is measured again. The moisture absorption coefficient is calculated by the following formula Moisture absorption coefficient (%)=(increase in weight/weight of sample collected)×100.

The moisture absorption coefficient of the silica particles contained in the silica sol of the present invention is 0.5 mass % or lower, preferably 0.3 mass % or lower, more preferably 0.2 mass % or lower.

The mean primary particle size of the silica particles contained in the silica sol of the present invention may be calculated by determining the specific surface area of silica powder obtained by drying the aforementioned silica particles through the nitrogen adsorption method and calculating with the following calculation formula.

Mean primary particle size (nm)=2720/specific surface area (m$^2$/g) obtained through the nitrogen adsorption method.

The primary particle size of silica particles contained in the silica sol of the present invention is 20 to 100 nm, preferably 30 to 80 nm, more preferably 40 to 70 nm.

In the present invention, the silica particle size based on the dynamic light scattering method may be determined by diluting the silica sol 10-fold to 100-fold (by volume) with the same dispersion medium as employed in the sol and determining the mean-variance particle size by means of a dynamic light scattering particle size meter (e.g., Zetasizer Nano, product of Malvern Instruments).

No particular limitation is imposed on the method of producing the silica sol of the present invention. In one embodiment, the silica sol is produced through heating silica particles in water preferably at 200 to 350° C., more preferably 230 to 300° C. Heating may be performed by means of a pressure vessel (i.e., an autoclave).

Preferably, the silica sol of the present invention is produced from active silicic acid as a starting material, which is obtained through dealkalization of aqueous alkali silicate. Examples of the aqueous alkali silicate include aqueous sodium silicate and aqueous potassium silicate. Dealkalization of aqueous alkali silicate is preferably performed through ion exchange by use of a cation exchange resin. Alternatively, active silicic acid obtained through a method including neutralization with acid and washing out the formed alkali metal salt may also be used as a starting material.

More preferably, the silica sol of the present invention is produced from high-purity active silicic acid as a starting material, which is prepared by adding strong acid to active silicic acid obtained through dealkalization of aqueous alkali silicate and then subjecting the product to cation exchange. Dealkalization of aqueous alkali silicate is preferably performed through ion exchange by use of a cation exchange resin. Examples of the strong acid include hydrochloric acid, sulfuric acid, and nitric acid.

No particular limitation is imposed on the method of producing the silica sol of the present invention, and the following production procedure may be employed. The aqueous alkali silicate serving as a starting material is, for example, a commercial product, aqueous sodium silicate (JIS No. 3). The aqueous sodium silicate is diluted with water to a silica concentration of about 1 to 5 mass %, to thereby prepare dilute aqueous sodium silicate. The dilution product is caused to pass through a column filled with an H-type strongly acidic cation exchange resin, to thereby yield aqueous solution of active silicic acid. The pH of the thus-prepared aqueous active silicic acid is adjusted to 0 to 2 with hydrochloric acid, sulfuric acid, or nitric acid, and the solution is maintained at room temperature to 60° C. for 1 to 24 hours. Subsequently, the resultant solution is caused to pass through a column filled with an H-type strongly acidic cation exchange resin and then through a column filled with an OH-type basic anion exchange resin, to thereby yield high-purity aqueous active silicic acid. The pH of the thus-prepared high-purity aqueous active silicic acid is adjusted to 7 to 9 with aqueous sodium hydroxide or aqueous potassium hydroxide, to thereby yield stabilized active silicic acid liquid. The stabilized aqueous active silicic acid preferably has a silica concentration of about 1 to 5 mass % and an $SiO_2/M_2O$ mole ratio (wherein M is Na or K) of 50 to 250. Through heating the thus-stabilized active silicic acid at 70 to 150° C., a high-purity, water-dispersion silica sol having a mean primary particle size of 10 to 30 nm can be obtained. When the thus-produced high-purity, water-dispersion silica sol is further heated at 200 to 350° C., silica particles are maintained in a dense state, and the formed silica particles have low moisture absorption coefficient. Heating at high temperature is preferably performed in water.

The silica particles contained in the silica sol of the present invention are surface-modified with an organic silane compound. Examples of the organic silane compound used in surface modification include silazane, siloxane, alkoxysilane, and a partial hydrolyzate and an oligomer (dimer to pentamer) thereof.

Examples of the silazane include hexamethyldisilazane and hexaethyldisilazane.

Examples of the siloxane include hexamethyldisiloxane, 1,3-dibutyltetramethyldisiloxane, 1,3-diphenyltetramethyldisiloxane, 1,3-divinyltetramethyldisiloxane, hexaethyldisiloxane, and 3-glycidoxypropylpentamethyldisiloxane.

Examples of the alkoxysilane include trimethylmethoxysilane, trimethylethoxysilane, trimethylpropoxysilane, phenyldimethylmethoxysilane, chloropropyldimethylmethoxysilane, dimethyldimethoxysilane, methyltrimethoxysilane, tetramethoxysilane, tetraethoxysilane, tetrapropoxysilane, tetrabutoxysilane, ethyltrimethoxysilane, dimethyldiethoxysilane, propyltriethoxysilane, n-butyltrimethoxysilane, n-hexyltrimethoxysilane, n-octyltriethoxysilane, n-octylmethyldiethoxysilane, n-octadecyltrimethoxysilane, phenyltrimethoxysilane, phenylmethyldimethoxysilane, phenethyltrimethoxysilane, dodecyltrimethoxysilane, n-octadecyltriethoxysilane, phenyltrimethoxysilane, diphenyldimethoxysilane, vinyltrimethoxysilane, vinyltriethoxysilane, vinyltris(β-methoxyethoxy)silane, γ-methacryloxypropyltrimethoxysilane, γ-acryloxypropyltrimethoxysilane, γ-(methacryloxypropyl)methyldimethoxysilane, γ-methacryloxypropylmethyldiethoxysilane, γ-methacryloxypropyltriethoxysilane, β-(3,4-epoxycyclohexyl)ethyltrimethoxysilane, γ-glycidoxypropyltrimethoxysilane, γ-glycidoxypropylmethyldiethoxysilane, γ-glycidoxypropyltriethoxysilane, N-β(aminoethyl)γ-(aminopropyl)methyldimethoxysilane, N-β(aminoethyl)γ-(aminopropyl)trimethoxysilane, N-β(aminoethyl)γ-(aminopropyl)triethoxysilane, γ-aminopropyltrimethoxysilane, γ-aminopropyltriethoxysilane, N-phenyl-γ-aminopropyltrimethoxysilane, γ-mercaptopropyltrimethoxysilane, 3-isocyanatopropyltriethoxysilane, trifluoropropyltrimethoxysilane, heptadecatrifluoropropyltrimethoxysilane, n-decyltrimethoxysilane, dimethoxydiethoxysilane, bis(triethoxysilyl)ethane, and hexaethoxydisiloxane.

The organic silane compound used for surface modification preferably has an epoxy group. Examples of the epoxy group-containing organic silane compound include β-(3,4-epoxycyclohexyl)ethyltrimethoxysilane, γ-glycidoxypropyltrimethoxysilane, γ-glycidoxypropylmethyldiethoxysilane, and γ-glycidoxypropyltriethoxysilane.

The surface modification of silica particles is preferably performed such that a surface area (1 nm$^2$) of silica particles is modified with 0.1 to 5 molecules of the organic silane compound. In a preferred mode of surface modification of silica particles, a specific amount of the organic silane compound is added to water-dispersion silica sol or organic solvent-dispersion silica sol, and the mixture is heated at 5 to 100° C. for 0.5 to 24 hours under stirring. In order to promote surface modification by the organic silane compound, an appropriate amount of a catalyst such as acid or alkali may be added.

The dispersion medium of the silica sol of the present invention is water, an organic solvent, or a resin monomer.

Examples of the organic solvent, serving as a dispersion medium of the silica sol of the present invention, include alcohol, ketone, ether, ester, and hydrocarbon. Such organic solvents may be used singly or in combination of two or more species. The organic solvent-dispersion silica sol may be formed through solvent substitution of a corresponding water-dispersion silica sol through a known technique such as distillation.

Examples of the alcohol include methanol, ethanol, 1-propanol, 2-propanol, 1-butanol, 2-butanol, isobutyl alcohol, tert-butyl alcohol, 1-pentanol, 1-hexanol, 1-octanol, 2-ethyl-1-hexanol, allyl alcohol, benzyl alcohol, cyclohexanol, 1,2-ethanediol, 1,2-propanediol, 2-methoxyethanol, 2-ethoxyethanol, 2-propoxyethanol, 2-(methoxyethoxy)ethanol, 1-methoxy-2-propanol, dipropylene glycol monomethyl ether, diacetone alcohol, ethyl carbitol, and butyl carbitol.

Examples of the ketone include acetone, methyl ethyl ketone, 2-pentanone, 3-pentanone, 2-hexanone, methyl isobutyl ketone, 2-heptanone, 4-heptanone, diisobutyl ketone, and cyclohexanone.

Examples of the ether include diethyl ether, dipropyl ether, diisopropyl ether, dibutyl ether, dioxane, tetrahydrofuran, and 1,2-diethoxyethane.

Examples of the ester include ethyl formate, propyl formate, butyl formate, methyl acetate, ethyl acetate, propyl acetate, butyl acetate, ethylene glycol monoethyl ether acetate, ethylene glycol monobutyl ether acetate, hydroxyethyl methacrylaye, hydroxyethyl acrylate, γ-butyrolactone, methyl methacrylate, isobutyl acrylate, cyclohexyl acrylate, 2-ethoxyethyl acrylate, trifluoroethyl acrylate, and glycidyl methacrylate.

Examples of the hydrocarbon include n-hexane, cyclohexane, benzene, toluene, xylene, solvent naphtha, styrene, and halo-hydrocarbons such as dichloromethane and trichloroethylene.

Examples of the resin monomer, serving as a dispersion medium of the silica sol of the present invention, include a resin monomer having an ethylenic unsaturated bond, a resin monomer having an epoxy ring, and a resin monomer having an oxetane ring. The resin monomer-dispersion silica sol may be formed through solvent substitution of a corresponding water-dispersion silica sol or an organic-solvent dispersion silica sol through a known technique such as distillation.

Examples of the resin monomer having an ethylenic unsaturated bond include unsaturated carboxylic acid compounds such as acrylic acid, methacrylic acid, itaconic acid, crotonic acid, maleic acid, and phthalic acid.

Examples of the monomer further include unsaturated carboxylic acid ester compounds derived from the aforementioned unsaturated carboxylic acid compounds and an alcohol compound. Specific examples include acrylate ester compounds, methacrylate ester compounds, itaconate ester compounds, crotonate ester compounds, maleate ester compounds, and phthalate ester compounds. No particular limitation is imposed on the alcohol compound which reacts with the aforementioned unsaturated carboxylic acid compounds to form the unsaturated carboxylic acid esters. Examples of the alcohol compound include polyol compounds having 2 to 6 hydroxyl groups, such as ethylene glycol, triethylene glycol, tetraethylene glycol, tris(2-hydroxyethyl) isocyanurate, triethanolamine, and pentaerythritol.

Examples of the monomer further include unsaturated carboxylic acid amide compounds derived from the aforementioned unsaturated carboxylic acid compounds and an amine compound. Specific examples include acrylamide compounds, methacrylamide compounds, itaconamide compounds, crotonamide compounds, maleamide compounds, and phthalamide compounds. No particular limitation is imposed on the amine compound, and examples of the amine compound include polyamine compounds having 2 to 6 primary or secondary amino groups, such as ethylenediamine, diaminocyclohexane, diaminonaphthalene, 1,4-bis(aminomethyl)cyclohexane, 3,3',4,4'-tetraaminobiphenyl, and tris(2-aminoethyl)amine.

Specific examples of the resin monomer having an ethylenic unsaturated bond include ethylene glycol di(meth)acrylate, diethylene glycol di(meth)acrylate, triethylene glycol di(meth)acrylate, tetraethylene glycol di(meth)acrylate, nonaethylene glycol di(meth)acrylate, polyethylene glycol di(meth)acrylate, tripropylene glycol di(meth)acrylate, tetrapropylene glycol di(meth)acrylate, nonapropylene glycol di(meth)acrylate, polypropylene glycol di(meth)acrylate, 2,2-bis[4-((meth)acryloxydiethoxy)phenyl]propane, 3-phenoxy-2-propanoyl acrylate, 1,6-bis(3-acryloxy-2-hydroxypropyl)-hexyl ether, trimethylolpropane tri(meth)acrylate, glycerol tri(meth)acrylate, tris-(2-hydroxyethyl)-isocyanurate ester (meth)acrylate, pentaerythritol tri(meth)acrylate, pentaerythritol tetra(meth)acrylate, dipentaerythritol tri(meth)acrylate, dipentaerythritol penta(meth)acrylate, dipentaerythritol hexa(meth)acrylate, tripentaerythritol octa(meth)acrylate, tripentaerythritol hepta(meth)acrylate, 2-hydroxypropyl(meth)acrylate, 2-ethylhexyl (meth)acrylate, 2-norbornylmethyl methacrylate, 2-hydroxy-3-phenoxypropyl (meth)acrylate, 2-hydroxyethyl (meth)acrylate, 2,2-dimethylbutyl acrylate, 2-hydroxybutyl (meth)acrylate, n-propyl (meth)acrylate, n-butyl (meth)acrylate, i-butyl (meth)acrylate, t-butyl (meth)acrylate, n-hexyl (meth)acrylate, n-pentyl (meth)acrylate, n-octyl (meth)acrylate, 2-methoxyethyl (meth)acrylate, 2-methoxymethoxyethyl acrylate, 3-pentyl (meth)acrylate, 3-methyl-2-norbornylmethyl methacrylate, 3-methoxybutyl (meth)acrylate, 4-hydroxybutyl (meth)acrylate, 4-methyl-2-propylpentyl acrylate, 5-norbornene-2-yl-methyl methacrylate, i-propyl (meth)acrylate, n-octadecyl (meth)acrylate, n-nonyl (meth)acrylate, sec-butyl (meth)acrylate, t-pentyl (meth)acrylate, ethyl α-hydroxymethylacrylate, butyl α-hydroxymethylacrylate, methyl α-hydroxymethylacrylate, (meth)acrylic acid, n-stearyl acrylate, isooctyl acrylate, isononyl acrylate, isobornyl (meth)acrylate, ethyl (meth)acrylate, ethyl catbitol acrylate, ethoxyethyl (meth)acrylate, ethoxyethoxyethyl (meth)acrylate, ethoxydiethylene glycol acrylate, cyclohexyl (meth)acrylate, cyclohexylmethyl (meth)acrylate, cyclopentyl acrylate, dicyclopentenyloxyethyl acrylate, cetyl acrylate, tetrahydrofurfuryl (meth)acrylate, phenoxyethyl (meth)acrylate, (meth)acryloyloxyethyl hydrogenphthalate, benzyl (meth)acrylate, methyl (meth)acrylate, methoxyethyl (meth)acrylate, methoxyethoxyethyl (meth)acrylate, methoxypolyethylene glycol (meth)acrylate, lauryl (meth)acrylate, 1,3-butanediol di(meth)acrylate, 1,4-butanediol di(meth)acrylate, 1,6-hexanediol di(meth)acrylate, 1,9-nonanediol di(meth)acrylate, allylated cyclohexyl di(meth)acrylate, glycerin di(meth)acrylate, dicyclopentanyl di(meth)acrylate, tricyclodecanedimethanol di(meth)acrylate, trimethylolpropane di(meth)acrylate, neopentyl glycol adipate di(meth)acrylate, neopentyl glycol di(meth)acrylate, neopentyl glycol hydroxypyvalate ester diacrylate, ethoxylated trimethylolpropane tri(meth)acrylate, glycerinpropoxy tri(meth)acrylate, trimethylolpropanepolyethoxy tri(meth)acrylate, propionic acid-modified dipentaerythritol tri(meth)acrylate, ditrimethylolpropanetetra (meth)acrylate, propionic acid-modified dipentaerythritol tetra(meth)acrylate, propoxylated pentaerythritol tetra(meth)acrylate, propionic acid-modified dipentaerythritol penta(meth)acrylate, glycidyl methacrylate, N,N-dimethylacrylamide, N,N-diethylacrylamide, vinylbenzene, divinylbenzene, vinyltoluene, styrene, α-methylstyrene, and p-methylstyrene. Notably, the term "ethylene glycol di(meth)acrylate" refers to ethylene glycol diacrylate and ethylene glycol dimethacrylate. The same is applied to the similar cases.

Examples of the resin monomer having an ethylenic unsaturated bond further include an urethane compound which can be formed through reaction between a polyvalent isocyanate compound and an unsaturated carboxylic acid hydroxyalkyl ester compound; a compound which can be formed through reaction between a polyvalent epoxy compound and an unsaturated carboxylic acid hydroxyalkyl ester compound; a diallyl ester compound such as diallyl phthalate; and a divinyl compound such as divinyl phthalate.

The resin monomer having an epoxy ring used in the present invention may be a compound having 1 to 6 epoxy rings. Examples of the polymerizable compound having 1 to 6 epoxy rings include compounds each having two or more glycidyl ether moieties or glycidyl ester moieties. Such compounds may be produced from a compound having two or more hydroxyl groups or carboxyl groups (e.g., a diol compound, a triol compound, a dicarboxylic acid compound, or a tricarboxylic acid compound) with a glycidyl compound such as epichlorhydrin.

Specific examples of the resin monomer having an epoxy ring include 1,4-butanediol diglycidyl ether, 1,2-epoxy-4-(epoxyethyl)cyclohexane, glycerol triglycidyl ether, diethylene glycol diglycidyl ether, 2,6-diglycidylphenyl glycidyl ether, 1,1,3-tris[p-(2,3-epoxypropoxy)phenyl]propane, 1,2-cyclohexanedicarboxylic acid diglycidyl ester, 4,4'-methylenebis(N,N-diglycidylaniline), 3,4-epoxycyclohexylmethyl-3,4-epoxycyclohexane carboxylate, trimethylolethane triglycidyl ether, triglycidyl-p-aminophenol, tetraglycidylmetaxylenediamine, tetraglycidyldiaminodiphenylmethane, tetraglycidyl-1,3-bisaminomethylcyclohexane, bisphenol A diglycidyl ether, bisphenol S diglycidyl ether, pentaerythritol tetraglycidyl ether, resorcinol diglycidyl ether, diglycidyl phthalate, neopentyl glycol diglycidyl ether, polypropylene glycoldiglycidyl ether, tetrabromobisphenol A diglycidyl ether, bisphenol hexafluoroacetone diglycidyl ether, pentaerythritol diglycidyl ether, hydrogenated bisphenol A diglycidyl ether, tris(2,3-epoxypropyl) isocyanurate, 1-{2,3-di(propionyloxy)}-3,5-bis(2,3-epoxypropyl)-1,3,5-triazine-2,4,6-(1H,3H,5H)-trione, 1,3-bis{2,3-di(propionyloxy)}-5-(2,3-epoxypropyl)-1,3,5-triazine-2,4,6-(1H,3H,5H)-trione, monoallyl diglycidyl isocyanurate, diglycerol polydiglycidyl ether, pentaerythritol polyglycidyl ether, 1,4-bis(2,3-epoxypropoxyperfluoroisopropyl)cyclohexane, sorbitol polyglycidyl ether, trimethylolpropane polyglycidyl ether, resorcin diglycidyl ether, 1,6-hexanediol diglycidyl ether, polyethylene glycol diglycidyl ether, phenylglycidyl ether, p-tert-butylphenyl glycidyl ether, diglycidyl ether adipate, o-phthalic acid diglycidyl ether, dibromophenyl glycidyl ether, 1,2,7,8-diepoxyoctane, 1,6-dimethylol perfluorohexane diglycidyl ether, 4,4'-bis(2,3-epoxypropoxyperfluoroisopropyl)diphenyl ether, 2,2-bis(4-glycidyloxyphenyl) propane, 3,4-epoxycyclohexylmethyl-3',4'-epoxycyclohexane carboxylate, 3,4-epoxycyclohexyloxylane, 2-(3,4-epoxycyclohexyl)-3',4'-epoxy-1,3-dioxane-5-spirocyclohexane, 1,2-ethylenedioxybis(3,4-epoxycyclohexylmethane), 4',5'-epoxy-2'-methylcyclohexylmethyl-4,5-epoxy-2-methylcyclohexane carboxylate, ethylene glycol bis(3,4-epoxycyclohexane carboxylate), bis(3,4-epoxycyclohexylmethyl) adipate, and bis (2,3-epoxycyclopentyl) ether.

The resin monomer having an oxetane ring used in the present invention may be a compound having 1 to 6 oxetane rings. Examples thereof include 3-ethyl-3-hydroxymethyloxetane, 3-ethyl-3-(phenoxymethyl)oxetane, 3,3-diethyloxetane, 3-ethyl-3-(2-ethylhexyloxymethyl)oxetane, 1,4-bis (((3-ethyl-3-oxetanyl)methoxy)methyl)benzene, di((3-ethyl-3-oxetanyl)methyl) ether, and pentaerythritoltetrakis ((3-ethyl-3-oxetanyl)methyl) ether.

The silica sol of the present invention can be prepared as a sol having a silica concentration of 1 to 70 mass %.

Also, the present invention is directed to a silica powder which is produced by drying the silica sol of the present invention at 250° C. or lower. When the drying temperature exceeds 250° C., the organic silane compound serving as a surface-modifying agent may decompose.

Also, the present invention is directed to a silica-containing epoxy resin composition prepared by mixing the silica sol of the present invention or the silica powder of the present invention with an epoxy resin monomer and an epoxy resin-curing agent.

In production of the silica-containing epoxy resin composition of the present invention, the same monomers as the aforementioned resin monomer having an epoxy ring may be used as the epoxy resin monomers.

Examples of the epoxy resin-curing agent include phenolic resin, amine, polyamide resin, imidazole, polymercaptan, acid anhydride, and a cationic polymerization initiator.

Examples of the phenolic resin include phenol novolak resin and cresol novolak resin.

Examples of the amine include piperidine, N,N-dimethylpiperazine, triethylenediamine, 2,4,6-tris(dimethylaminomethyl)phenol, benzyldimethylamine, 2-(dimethylaminomethyl)phenol, diethylenetriamine, triethylenetetramine, tetraethylenepentamine, diethylaminopropylamine, N-aminoethylpiperazine, di(1-methyl-2-aminocyclohexyl) methane, menthenediamine, isophoronediamine, diaminodicyclohexylmethane, 1,3-diaminomethylcyclohexane, xylenediamine, m-phenylenediamine, diaminodiphenylmethane, and diaminodiphenyl sulfone. Among them, diethylenetriamine, triethylenetetramine, tetraethylenepentamine, diethylaminopropylamine, N-aminoethylpiperazine, di(1-methyl-2-aminocyclohexyl)methane, menthenediamine, isophoronediamine, diaminodicyclohexylmethane, and the like, which are liquid-form amines, are preferably used.

An example of the polyamide resin is a polyamide amine which is formed through condensation between dimer acid and polyamine and which includes a primary amine and a secondary amine in the molecule thereof.

Examples of the imidazole include 2-methylimidazole, 2-ethyl-4-methylimidazole, 1-cyanoethyl-2-undecylimidazolium trimellitate, and epoxy imidazole adducts.

Polymercaptans include, for example, a mercaptan-group-end-capped polypropylene glycol and a mercaptan-group-end-capped polyethylene glycol. A liquid form polymercaptan is preferred.

The acid anhydride is preferably an anhydride of a compound having a plurality of carboxyl groups in the molecule thereof. Examples of the acid anhydride include phthalic anhydride, trimellitic anhydride, pyromellitic anhydride, benzophenonetetracarboxylic acid anhydride, ethylene glycol bis(trimellitate), glycerol tris(trimellitate), maleic anhydride, tetrahydrophthalic anhydride, methyltetrahydrophthalic anhydride, endo-methylenetetrahydrophthalic anhydride, methyl-endo-methylenetetrahydrophthalic anhydride, methylbutenyltetrahydrophthalic anhydride, dedecenylsuccinic anhydride, hexahydrophthalic anhydride, methylhexahydrophthalic anhydride, succinic anhydride, methylcyclohexenedicarboxylic acid anhydride, and chlorendic anhydride.

The cationic polymerization initiator employable in the present invention releases a substance which can initiate cationic polymerization by light or heat.

Examples of the photo-cationic polymerization initiator include onium salts such as an aromatic diazonium salt, an aromatic halonium salt, and an aromatic sulfonium salt; organometallic complexes such as an iron-arene complex, a titanocene complex, and an arylsilanol-aluminum complex; nitrobenzyl esters, sulfonic acid derivatives, phosphate esters, phenolsulfonate esters, diazonaphthoquinone, and N-hydroxyimide sulfonate. Examples of commercial products of the photo-cationic polymerization initiator include Adeca Optomer series such as "Adeka Optomer SP150" and "Adeka Optomer SP170" (products of ADEKA), UVA-CURE 1591 (product of UCB), CD-1010, CD-1011, and CD-1012 (products of Sartomer), Irgacure (registered trademark) 264 (product of Ciba Geigy), and CIT-1682 (product of Nippon Soda Co., Ltd.).

Any thermal cationic polymerization initiator may be used in the present invention, so long as it is activated by heating to induce ring opening of a ring-opening polymerizable group. Examples thereof include onium salts such as a quaternary ammonium salt, a phosphonium salt, and a sulfonium salt.

Examples of the quaternary ammonium salt include tetrabutylammonium tetrafluoroborate, tetrabutylammonium hexafluorophosphate, tetrabutylammonium hydrogensulfate, tetraethylammonium tetrafluoroborate, tetraethylammonium p-toluenesulfonate, N,N-dimethyl-N-benzylanilinium hexafluoroantimonate, N,N-dimethyl-N-benzylanilinium tetrafluoroborate, N,N-dimethyl-N-benzylpyridinium hexafluoroantimonate, N,N-diethyl-N-benzyl trifluoromethanesulfonate, N,N-dimethyl-N-(4-methoxybenzyl)pyridinium hexafluoroantimonate, and N,N-diethyl-N-(4-methoxybenzyl)toluidinium hexafluoroantimonate.

Examples of the phosphonium salt include ethyltriphenylphosphonium hexafluoroantimonate and tetrabutylphosphonium hexafluoroantimonate.

Examples of the sulfonium salt include triphenylsulfonium tetrafluoroborate, triphenylsulfonium hexafluoroantimonate, triphenylsulfonium hexafluoroarsenate, tris(4-methoxyphenyl)sulfonium hexafluoroarsenate, and diphenyl (4-phenylthiophenyl)sulfonium hexafluoroarsenate.

Examples of commercial products of the thermal cationic polymerization initiator include Adeka Opton (registered trademark) CP-66, Adeka Opton (registered trademark) CP-77 (products of ADEKA), San-Aid (registered trademark) SI-60L, San-Aid (registered trademark) SI-80L, San-Aid (registered trademark) SI-100L (products of Sanshin Chemical Industry Co., Ltd.), and CI series (products of Nippon Soda Co., Ltd.).

In preparation of the silica-containing epoxy resin composition of the present invention, an appropriate curing accelerator may be used in combination of the polymerization initiator. Examples of the curing accelerator include organic phosphorus compounds such as triphenylphosphine and tributylphosphine; quaternary phosphonium salts such as ethyltriphenylphosphonium bromide and methyltriphenylphosphonium phosphate diethyl ester; and 1,8-diazabicyclo(5,4,0)undecane-7-ene, 1,8-diazabicyclo(5,4,0)undecane-7-ene octylate salt, zinc octylate, and quaternary ammonium salts such as tetrabutylammonium bromide. Any of the curing accelerator may be used in an amount of 0.001 to 0.1 parts by mass, with respect to 1 part by mass of the epoxy resin-curing agent.

No particular limitation is imposed on the mixing technique for preparing the silica-containing epoxy resin composition of the present invention. In one preferred mode, silica sol or silica powder is mixed with epoxy resin or an epoxy resin-curing agent by means of a mixer or a kneader, to thereby prepare a uniform mixture. For example, mixing is preferably performed under sufficient stirring with a revolution-rotation mode mixer.

In the case where the silica-containing epoxy resin composition has high viscosity to thereby impede uniform mixing in a speedy manner, it is preferred that the mixture is heated at such a temperature that curing reaction does not proceed, whereby the viscosity of the mixture is reduced to enhance operability.

When the aforementioned epoxy resin-curing agent contains organic solvent, the formed silica-containing epoxy resin composition unavoidably contains organic solvent. In this case, the remaining organic solvent is preferably removed through treating the composition under reduced pressure or heating the composition.

Through curing the silica-containing epoxy resin composition of the present invention by heat or light, a cured product of the silica-containing epoxy resin can be formed.

In the present invention, the silica-containing epoxy composition is thermally cured at about 80 to about 200° C. for about 1 to about 12 hours. Heating may be performed by means of an oven.

The active energy ray which is utilized in photocuring of the silica-containing epoxy composition of the present invention has a wavelength of 150 to 500 nm, preferably 300 to 400 nm, and preferably has a dose of 10 to 3,000 mJ/cm$^2$. Examples of preferred light sources include a low-pressure mercury lamp, a high-pressure mercury lamp, an ultra-high-pressure mercury lamp, a carbon arc lamp, a UV fluorescent lamp, a chemical lamp, a xenon lamp, and a zirconium lamp.

EXAMPLES

Example 1

Step (a): Aqueous sodium silicate (JIS No. 3) was provided as aqueous water-soluble alkali metal silicate as a starting material. The aqueous sodium silicate mainly contains $SiO_2$ (28.8 mass %) and $Na_2O$ (9.47 mass %), except for water. Specifically, the above aqueous sodium silicate (52.5 kg) was dissolved in pure water (367.5 kg), to thereby prepare an aqueous solution (420 kg) of sodium silicate having an $SiO_2$ concentration of 3.6 mass %. Then, the above aqueous sodium silicate (25° C.) was caused to pass through a column filled with an H-type strongly acidic cation exchange resin, Amberlite (registered trademark) IR-120B, at a volume rate per hour of 3. The thus-produced aqueous active silicic acid (25° C.) having an $SiO_2$ concentration of 3.6 mass % and a pH of 2.93 was recovered in a container, in an amount of 357 kg.

Step (b): A commercial special grade reagent of sulfuric acid (product of Kanto Kagaku) was diluted with pure water, to thereby prepare 10-mass % sulfuric acid as a strong acid. To the aqueous active silicic acid (357 kg) obtained in step (a), the above 10-mass % sulfuric acid (8.9 kg) was added, and the pH of the mixture was adjusted to 1.54. The resultant mixture was maintained at 20° C. for 48 hours, to terminate step (b).

Step (c): The aforementioned aqueous active silicic acid (365.9 kg) obtained in step (b) and containing sulfuric acid was caused to pass through a column filled with an H-type strongly acidic cation exchange resin, Amberlite (registered trademark) IR-120B (20 L), at about 25° C. and at a volume rate per hour of 5. Subsequently, the entirety of the recovered liquid was then caused to pass through a column filled with an OH-type strongly basic anion exchange resin (50 L), Amberlite (registered trademark) IRA-410, at about 25° C. and at a volume rate per hour of 2. Subsequently, the entirety of the recovered liquid was then caused to pass through a column filled with another H-type strongly acidic cation exchange resin (10 L), Amberlite (registered trademark) IR-120B, at about 25° C. and at a volume rate per hour of 10. Thus, the ion-exchanged aqueous active silicic acid was recovered in a container, in an amount of 362.3 kg. The solution was found to have an $SiO_2$ concentration of 3.5 mass % and a pH of 4.38.

Step (d): A commercial special grade reagent of sodium hydroxide (product of Kanto Kagaku) was dissolved in pure water, to thereby prepare a 10-mass % aqueous sodium hydroxide solution. The solution (2.1 kg) was added to an ion-exchanged active silicic acid (362.3 kg) obtained in step (c), to thereby form a stabilized aqueous solution of active silicic acid. The aqueous solution was found to have an $SiO_2$ concentration of 3.5 mass %, an $SiO_2/Na_2O$ mole ratio of 80, and a pH of 8.20.

Step (e): The stabilized aqueous solution (2.8 kg) of active silicic acid obtained in step (d) was added to a stainless steel autoclave reactor (capacity: 3 L) and hydrothermally treated at 130° C. for 5 hours. The hydrothermal treatment was repeatedly performed five times in total, to thereby yield 14 kg of a hydrothermal treatment product. The hydrothermal treatment product was identified to be an alkaline silica sol which has an $SiO_2$ concentration of 3.5 mass %, a pH of 10.3, a mean primary particle size of 13 nm, and a silica particle size, as measured through dynamic light scattering, of 22 nm.

Step (f): The alkaline silica sol produced in step (e) was condensed by means of an ultra-filtration membrane apparatus, to thereby yield 1.6 kg of an alkaline silica sol having an $SiO_2$ concentration of 31.0 mass % and a pH of 9.27.

Step (g): The alkaline silica sol (1.6 kg) produced in step (f) was then caused to pass through a column filled with another H-type strongly acidic cation exchange resin, Amberlite (registered trademark) IR-120B, at about 25° C. and at a volume rate per hour of 5. Subsequently, a commercial special grade reagent of sodium hydroxide was dissolved in pure water, to thereby prepare a 10-mass % aqueous sodium hydroxide solution, and the solution (16.3 g) was added thereto, to thereby adjust the $SiO_2$ concentration, the pH, and the $SiO_2/Na_2O$ mole ratio of the alkaline silica sol to 30.0 mass %, 8.20, and 400, respectively.

Step (h): To an SUS autoclave reactor (capacity: 3 L), the alkaline silica sol (1.5 kg) prepared in step (g) whose $SiO_2/Na_2O$ mole ratio was adjusted to 400 was added, and hydrothermally treated at 245° C. for 2.5 hours. The thus-obtained silica sol was found to have a pH of 10.2, a mean primary particle size of 45 nm, and a silica particle size, as determined through dynamic light scattering, of 74 nm.

Step (i): The alkaline silica sol (1.5 kg) produced in step (h) was caused to pass through a column filled with another H-type strongly acidic cation exchange resin, Amberlite (registered trademark) IR-120B, at about 25° C. and at a volume rate per hour of 10, to thereby obtain an acidic silica sol having an $SiO_2$ concentration of 30.0 mass % and a pH of 3.50.

Step (j): The acidic silica sol (1,200 g) produced in step (i) was placed in a 2 L separable flask, and methanol (200 g) and tri-n-propylamine (1.0 g) were added thereto under stirring. Thereafter, methanol gas was fed into the silica sol for solvent substitution, to thereby yield 1,800 g of a methanol-dispersion silica sol having an $SiO_2$ concentration of 20 mass % and a water content of 1.2 mass %.

Step (k): The methanol-dispersion silica sol (1,000 g) produced in step (j) was placed in a 2 L eggplant shaped flask. To the mixture, phenyltrimethoxysilane (12.1 g) was added under stirring with a magnetic stirrer. The resultant mixture was heated at 60° C. and maintained at 60° C. for 3 hours. The phenyltrimethoxysilane was added such that a surface area (1 $nm^2$) of silica particles of the sol was modified with 3.0 molecules of the silane compound. Subsequently, the eggplant shaped flask was attached to a rotary evaporator, and the mixture in the flask was subjected to distillation under a reduced pressure of 500 to 350 Torr at a bath temperature of 80° C., while methyl ethyl ketone was continuously fed into the flask, to thereby yield a methyl ethyl ketone-dispersion silica sol. The thus-formed sol was found to have an $SiO_2$ concentration of 30.5 mass %, a water content of 0.03 mass %, a methanol content of 0.5 mass %, a silica particle size, as determined through dynamic light scattering, of 74 nm, and a silica particle size/mean primary particle size ratio, as determined through dynamic light scattering, of 1.6. The thus-formed silica sol was dried in a vacuum drier at 80° C., to thereby form a silica gel, which was then pulverized with a mortar and further dried at 180° C. for 3 hours, to thereby form a silica powder. The thus-obtained silica powder was found to have a moisture absorption coefficient, as determined after allowing the silica powder to stand for 48 hours at 23° C. and a relative humidity of 50 RH %, of 0.1 mass %.

The α-ray emission rate of silica powder was measured by means of a 2π gas flow counting low level α-ray measuring device, and was 0.002 counts/$cm^2$·hr.

Example 2

The procedure of steps (a) to (i) of Example 1 was repeated, except that the hydrothermal treatment of step (h) of Example 1 was performed at 200° C., to thereby produce an acidic silica sol having an $SiO_2$ concentration of 30.0 mass %, a pH of 3.60, a mean primary particle size, as determined through dynamic light scattering, 22 nm, and a silica particle size of 45 nm. Subsequently, the procedure of steps (i) to (k) of Example 1 was repeated, to thereby form a methyl ethyl ketone-dispersion silica sol. In step (k), the amount of phenyltrimethoxysilane added was such that a surface area (1 $nm^2$) of silica particles of the sol was modified with 3.0 molecules of the silane compound. The thus-formed sol was found to have an $SiO_2$ concentration of 30.5 mass %, a water content of 0.07 mass %, a methanol content of 0.5 mass %, a silica particle size, as determined through dynamic light scattering, of 45 nm, and a silica particle size/mean primary particle size ratio, as determined through dynamic light scattering, of 2.0. The thus-formed silica sol was dried in a vacuum drier at 80° C., to thereby form a silica gel, which was then pulverized with a mortar and further dried at 180° C. for 3 hours, to thereby form a silica powder. The thus-obtained silica powder was found to have an α-ray emission rate of 0.002 counts/$cm^2$·hr and a moisture absorption coefficient, as determined after allowing the silica powder to stand for 48 hours at 23° C. and a relative humidity of 50 RH %, of 0.3 mass %.

Example 3

The procedure of Example 1 was repeated, except that phenyltrimethoxysilane (12.1 g) was changed to epoxycyclohexyltrimethoxysilane (15.1 g) in step (k), to thereby form a methyl ethyl ketone-dispersion silica sol. The amount of epoxycyclohexyltrimethoxysilane added was such that a surface area (1 $nm^2$) of silica particles of the sol was modified with 3.0 molecules of the silane compound. The thus-formed sol was found to have an $SiO_2$ concentration of 30.5 mass %, a water content of 0.07 mass %, a methanol content of 0.5 mass %, a mean primary particle size of 45 nm, a silica particle size, as determined through dynamic light scattering, of 75 nm, and a silica particle size/mean primary particle size ratio, as determined through dynamic light scattering, of 1.7. The thus-formed silica sol was dried in a vacuum drier at 80° C., to thereby form a silica gel, which was then pulverized with a mortar and further dried at 180° C. for 3 hours, to thereby form a silica powder. The thus-obtained silica powder was found to have an α-ray emission rate of 0.002 counts/cm$^2$·hr and a moisture absorption coefficient, as determined after allowing the silica powder to stand for 48 hours at 23° C. and a relative humidity of 50 RH %, of 0.1 mass %.

Example 4

The procedure of Example 1 was repeated, except that methacryloxypropyltrimethoxysilane was used instead of phenyltrimethoxysilane in such an amount that a surface area (1 nm$^2$) of silica particles of the sol was modified with 3.0 molecules of the silane compound, to thereby form 1,000 g of a methyl ethyl ketone-dispersion silica sol. The thus-formed sol was found to have an SiO$_2$ concentration of 30.5 mass %, a water content of 0.07 mass %, a methanol content of 0.5 mass %, a mean primary particle size of 45 nm, a silica particle size, as determined through dynamic light scattering, of 74 nm, and a silica particle size/mean primary particle size ratio, as determined through dynamic light scattering, of 1.6. The thus-formed silica sol was dried in a vacuum drier at 80° C., to thereby form a silica gel, which was then pulverized with a mortar and further dried at 180° C. for 3 hours, to thereby form a silica powder. The thus-obtained silica powder was found to have an α-ray emission rate of 0.002 counts/cm$^2$·hr and a moisture absorption coefficient, as determined after allowing the silica powder to stand for 48 hours at 23° C. and a relative humidity of 50 RH %, of 0.1 mass %.

Example 5

The methanol-dispersion silica sol (mean primary particle size: 45 nm) (1,000 g) produced in steps (a) through (j) of Example 1 was placed in a 2 L eggplant shaped flask. To the mixture, phenyltrimethoxysilane (4.4 g) was added under stirring with a magnetic stirrer. The resultant mixture was heated at 60° C. for 8 hours. The mixture was then cooled to 50° C., and hexamethyldisilazane (50 g) was added thereto. The resultant mixture was heated at 60° C. for 4 hours, to thereby form a surface-treated methanol-dispersion silica sol. Subsequently, the silica sol was subjected to solvent removal to dryness by means of a rotary evaporator under a reduced pressure of 400 to 20 Torr at a bath temperature of 100° C., to thereby a silica powder. The thus-obtained silica powder was dispersed in methyl ethyl ketone, and the silica particle size was determined through dynamic light scattering. The particle size was 80 nm. The obtained silica powder has a silica particle size/mean primary particle size ratio, as determined through dynamic light scattering, of 1.8, an α-ray emission rate of 0.002 counts/cm$^2$·hr, and a moisture absorption coefficient, as determined after allowing the silica powder to stand for 48 hours at 23° C. and a relative humidity of 50 RH %, lower than 0.1 mass %.

Example 6

To the methyl ethyl ketone-dispersion silica sol (100 g) produced in Example 1, an alicyclic epoxy resin monomer (Celloxide 2021P: product of Daicel Corporation) (36.7 g) was added, and the mixture was subjected to solvent removal under a reduced pressure of 200 to 10 Torr at a bath temperature of 100° C., to thereby yield an alicyclic epoxy resin monomer-dispersion silica sol. The thus-obtained silica sol was found to have a B-type viscosity of 1,050 mPa·s, measured at an SiO$_2$ concentration of 45.4 mass %, a methyl ethyl ketone content lower than 0.1 mass %, and 23° C.

Example 7

To the methyl ethyl ketone-dispersion silica sol (100 g) produced in Example 1, a bisphenol F epoxy resin monomer (YL-983U, product of Mitsubishi Chemical Corporation) (36.7 g) was added, and the mixture was subjected to solvent removal under a reduced pressure of 200 to 10 Torr at a bath temperature of 100° C., to thereby yield a bisphenol F epoxy resin monomer-dispersion silica sol. The thus-obtained silica sol was found to have a B-type viscosity of 2,500 mPa·s, measured at an SiO$_2$ concentration of 45.4 mass %, a methyl ethyl ketone content lower than 0.1 mass %, and 50° C.

Example 8

To the methyl ethyl ketone-dispersion silica sol (100 g) produced in Example 2, an alicyclic epoxy resin monomer (Celloxide 2021P: product of Daicel Corporation) (36.7 g) was added, and the mixture was subjected to solvent removal under a reduced pressure of 200 to 10 Torr at a bath temperature of 100° C., to thereby yield an alicyclic epoxy resin monomer-dispersion silica sol. The thus-obtained silica sol was found to have a B-type viscosity of 1,500 mPa·s, measured at an SiO$_2$ concentration of 45.4 mass %, a methyl ethyl ketone content lower than 0.1 mass %, and 23° C.

Example 9

To the methyl ethyl ketone-dispersion silica sol (100 g) produced in Example 3, an alicyclic epoxy resin monomer (Celloxide 2021P: product of Daicel Corporation) (36.7 g) was added, and the mixture was subjected to solvent removal under a reduced pressure of 200 to 10 Torr at a bath temperature of 100° C., to thereby yield an alicyclic epoxy resin monomer-dispersion silica sol. The thus-obtained silica sol was found to have a B-type viscosity of 1,200 mPa·s, measured at an SiO$_2$ concentration of 45.4 mass %, a methyl ethyl ketone content lower than 0.1 mass %, and 23° C.

Example 10

To the methyl ethyl ketone-dispersion silica sol (100 g) produced in Example 4, an alicyclic epoxy resin monomer (Celloxide 2021P: product of Daicel Corporation) (36.7 g) was added, and the mixture was subjected to solvent removal under a reduced pressure of 200 to 10 Torr at a bath temperature of 100° C., to thereby yield an alicyclic epoxy resin monomer-dispersion silica sol. The thus-obtained silica sol was found to have a B-type viscosity of 1,100 mPa·s, measured at an SiO$_2$ concentration of 45.4 mass %, a methyl ethyl ketone content lower than 0.1 mass %, and 23° C.

Example 11

The silica powder (33 g) produced in Example 5 was fed to a fiber mixer (MX-X53: product of Panasonic) and pulverized for 5 minutes. An alicyclic epoxy resin monomer (Celloxide 2021P: product of Daicel Corporation) (70 g) was placed in a 300-mL cylindrical flask and heated at 80° C. The above-pulverized silica powder (32 g) was added thereto under stirring with a magnetic stirrer. The mixture was agitated for one hour, to thereby yield an alicyclic epoxy resin monomer-dispersion silica sol. The sol was found to have a B-type viscosity of 1,200 mPa·s, measured at 23° C.

Comparative Example 1

Steps (a), (d), (e), (f), and (i) of Example 1 were carried out in this order, to thereby yield an acidic silica sol. The thus-obtained acidic silica sol was found to have an $SiO_2$ concentration of 30 mass %, a pH of 2.9, a mean primary particle size 12 nm, and a silica particle size, as determined through dynamic light scattering, of 22 nm. The thus-obtained acidic silica sol (1,200 g) was subjected to steps (j) and (k) of Example 1, to thereby methyl ethyl ketone-dispersion silica sol. In step (k), the amount of phenyltrimethoxysilane added was adjusted such that a surface area (1 $nm^2$) of silica particles of the sol was modified with 3.3 molecules of the silane compound. The thus-produced sol was found to have to have an $SiO_2$ concentration of 30.5 mass %, a water content of 0.03 mass %, a methanol content of 0.5 mass %, a mean primary particle size of 12 nm, a silica particle size, as determined through dynamic light scattering, of 23 nm, and a silica particle size/mean primary particle size ratio, as determined through dynamic light scattering, of 1.9. The thus-formed silica sol was dried in a vacuum drier at 80° C., to thereby form a silica gel, which was then pulverized with a mortar and further dried at 180° C. for 3 hours, to thereby form a silica powder. The thus-obtained silica powder was found to have an α-ray emission rate of 0.027 counts/$cm^2$·hr and a moisture absorption coefficient, as determined after allowing the silica powder to stand for 48 hours at 23° C. and a relative humidity of 50 RH %, of 1.7 mass %.

Comparative Example 2

The procedure of Example 1 was repeated, except that steps (b) and (c) included in steps (a) to (i) were not performed, to thereby yield an acidic silica sol. The thus-obtained acidic silica sol was found to have an $SiO_2$ concentration of 30 mass %, a pH of 2.9, a mean primary particle size 40 nm, and a silica particle size, as determined through dynamic light scattering, of 80 nm. The thus-obtained acidic silica sol (1,200 g) was subjected to steps (j) and (k) of Example 1, to thereby methyl ethyl ketone-dispersion silica sol. In step (k), the amount of phenyltrimethoxysilane added was adjusted such that a surface area (1 $nm^2$) of silica particles of the sol was modified with 3.0 molecules of the silane compound. The thus-produced sol was found to have to have an $SiO_2$ concentration of 30.5 mass %, a water content of 0.04 mass %, a methanol content of 0.5 mass %, a mean primary particle size of 40 nm, a silica particle size, as determined through dynamic light scattering, of 80 nm, and a silica particle size/mean primary particle size ratio, as determined through dynamic light scattering, of 2.0. The thus-formed silica sol was dried in a vacuum drier at 80° C., to thereby form a silica gel, which was then pulverized with a mortar and further dried at 180° C. for 3 hours, to thereby form a silica powder. The thus-obtained silica powder was found to have an α-ray emission rate of 0.025 counts/$cm^2$·hr and a moisture absorption coefficient, as determined after allowing the silica powder to stand for 48 hours at 23° C. and a relative humidity of 50 RH %, of 0.1 mass %.

Comparative Example 3

The procedure of Example 1 was repeated, except that steps (g) and (h) included in steps (a) to (k) were not performed, to thereby yield a methyl ethyl ketone-dispersion silica sol. In step (k), the amount of phenyltrimethoxysilane added was adjusted such that a surface area (1 $nm^2$) of silica particles of the sol was modified with 3.0 molecules of the silane compound. The thus-produced sol was found to have to have an $SiO_2$ concentration of 30.5 mass %, a water content of 0.1 mass %, a methanol content of 0.5 mass %, a mean primary particle size of 13 nm, a silica particle size, as determined through dynamic light scattering, of 28 nm, and a silica particle size/mean primary particle size ratio, as determined through dynamic light scattering, of 2.2. The thus-formed silica sol was dried in a vacuum drier at 80° C., to thereby form a silica gel, which was then pulverized with a mortar and further dried at 180° C. for 3 hours, to thereby form a silica powder. The thus-obtained silica powder was found to have an α-ray emission rate of 0.002 counts/$cm^2$·hr and a moisture absorption coefficient, as determined after allowing the silica powder to stand for 48 hours at 23° C. and a relative humidity of 50 RH %, of 1.7 mass %.

Comparative Example 4

The procedure of Example 1 including steps (a) to (k) was repeated, except that the hydrothermal treatment of step (h) was performed at 180° C., to thereby yield a methyl ethyl ketone-dispersion silica sol. In step (k), the amount of phenyltrimethoxysilane added was adjusted such that a surface area (1 $nm^2$) of silica particles of the sol was modified with 3.0 molecules of the silane compound. The thus-produced sol was found to have to have an $SiO_2$ concentration of 30.5 mass %, a water content of 0.1 mass %, a methanol content of 0.5 mass %, a mean primary particle size of 18 nm, a silica particle size, as determined through dynamic light scattering, of 35 nm, and a silica particle size/mean primary particle size ratio, as determined through dynamic light scattering, of 1.9. The thus-formed silica sol was dried in a vacuum drier at 80° C., to thereby form a silica gel, which was then pulverized with a mortar and further dried at 180° C. for 3 hours, to thereby form a silica powder. The thus-obtained silica powder was found to have an α-ray emission rate of 0.002 counts/$cm^2$·hr and a moisture absorption coefficient, as determined after allowing the silica powder to stand for 48 hours at 23° C. and a relative humidity of 50 RH %, of 0.9 mass %.

Comparative Example 5

There was provided a commercial water-dispersion silica sol produced from alkoxide as a raw material (Quartron (registered trademark) PL-3L, $SiO_2$ concentration of 19 mass %, mean primary particle size of 39 nm, and silica particle size determined through dynamic light scattering of 62 nm, product of Fuso Chemical Co., Ltd.). The water-dispersion silica sol (1,000 g) was fed to a 2 L separable flask, and methanol (200 g) and tri-n-propylamine (1.0 g) were sequentially added thereto. Subsequently, methanol gas was fed into the silica sol for solvent substitution, to thereby yield a methanol-dispersion silica sol having a silica concentration of 20 mass % and a water content of 1.2 mass %. Thereafter, phenyltrimethoxysilane (13.0 g) was added thereto, and the mixture was maintained at 60° C. for 3 hours. The amount of phenyltrimethoxysilane added was such that a surface area (1 nm$^2$) of silica particles of the sol was modified with 3.0 molecules of the silane compound. Then, methanol, serving as the dispersion medium, was substituted by methyl ethyl ketone, to thereby yield methyl ethyl ketone-dispersion silica sol. The thus-produced sol was found to have to have an SiO$_2$ concentration of 30.5 mass %, a water content of 0.1 mass %, a methanol content of 0.3 mass %, a mean primary particle size of 39 nm, a silica particle size, as determined through dynamic light scattering, of 70 nm, and a silica particle size/mean primary particle size ratio, as determined through dynamic light scattering, of 1.8. The thus-formed silica sol was dried in a vacuum drier at 80° C., to thereby form a silica gel, which was then pulverized with a mortar and further dried at 180° C. for 3 hours, to thereby form a silica powder. The thus-obtained silica powder was found to have an α-ray emission rate less than 0.001 counts/cm$^2$·hr and a moisture absorption coefficient, as determined after allowing the silica powder to stand for 48 hours at 23° C. and a relative humidity of 50 RH %, of 6.2 mass %.

Comparative Example 6

A 10-mass % sodium hydroxide (12.6 g) prepared by dissolving commercial special grade sodium hydroxide (product of Kanto Kagaku) in pure water was added to the commercial water-dispersion silica sol (2,000 g) used in Comparative Example 5, to thereby yield 2,013 g of an alkaline water-dispersion silica sol (SiO$_2$ concentration: 19 mass %, SiO$_2$/Na$_2$ mole ratio: 400, pH: 8.99). This alkaline water-dispersion silica sol (2,013 g) was added to a stainless steel autoclave reactor (capacity: 3 L) and subjected to a hydrothermal treatment at 200° C. for 2.5 hours. The thus-formed silica sol was found to have a pH of 9.30, a mean primary particle size of 40 nm, and a silica particle size, as determined through dynamic light scattering, of 66 nm. Water remaining in the thus-treated silica sol was removed through distillation under reduced pressure by means of an evaporator so as to adjust the silica concentration to 30.0 mass %. Subsequently, the procedure of steps (i) to (k) of Example 1 was performed, to thereby a methyl ethyl ketone-dispersion silica sol. The thus-produced sol was found to have to have an SiO$_2$ concentration of 30.0 mass %, a water content of 0.1 mass %, a methanol content of 0.3 mass %, a mean primary particle size of 40 nm, a silica particle size, as determined through dynamic light scattering, of 70 nm, and a silica particle size/mean primary particle size ratio, as determined through dynamic light scattering, of 1.8. The thus-formed silica sol was dried in a vacuum drier at 80° C., to thereby form a silica gel, which was then pulverized with a mortar and further dried at 180° C. for 3 hours, to thereby form a silica powder. The thus-obtained silica powder was found to have an α-ray emission rate less than 0.001 counts/cm$^2$·hr and a moisture absorption coefficient, as determined after allowing the silica powder to stand for 48 hours at 23° C. and a relative humidity of 50 RH %, of 4.9 mass %.

Comparative Example 7

A commercial nano-size fused silica powder (UFP-80, mean primary particle size: 34 nm, product of Denki Kagaku Kogyo Kabushiki Kaisha) was provided. The silica powder (50 g) was fed to a fiber mixer (MX-X53: product of Panasonic) and pulverized for 5 minutes. Separately, pure water (200 g) was placed in a 1 L beaker, and the above-pulverized silica powder (50 g) was added to the beaker. The silica powder was ultrasonicated for 2 hours by means of an ultrasonic washer (W-222, product of Honda Electronics Co., Ltd.), to thereby yield a water-dispersion silica sol. The thus-obtained water-dispersion silica sol (250 g) was subjected to the procedure of steps (j) and (k) of Example 1. Specifically, the thus-produced water-dispersion silica sol (250 g) was placed in a 1 L separable flask, and methanol (50 g) and tri-n-propylamine (0.25 g) were added thereto under stirring. Thereafter, methanol gas was fed into the silica sol for solvent substitution, to thereby yield 250 g of a methanol-dispersion silica sol having an SiO$_2$ concentration of 20 mass % and a water content of 1.2 mass %. Subsequently, the thus-produced methanol-dispersion silica sol (250 g) was placed in a 1 L eggplant shaped flask. To the mixture, phenyltrimethoxysilane (4.0 g) was added under stirring with a magnetic stirrer. The resultant mixture was heated at 60° C. and maintained at 60° C. for 3 hours. The phenyltrimethoxysilane was added such that a surface area (1 nm$^2$) of silica particles of the sol was modified with 3.0 molecules of the silane compound. Subsequently, the eggplant shaped flask was attached to a rotary evaporator, and the mixture in the flask was subjected to distillation under a reduced pressure of 500 to 350 Torr at a bath temperature of 80° C., while methyl ethyl ketone was continuously fed into the flask, to thereby yield a methyl ethyl ketone-dispersion silica sol. The thus-formed sol was found to have an SiO$_2$ concentration of 15.5 mass %, a water content of 0.1 mass %, a methanol content of 0.3 mass %, a mean primary particle size of 34 nm, a silica particle size, as determined through dynamic light scattering, of 210 nm, and a silica particle size/mean primary particle size ratio, as determined through dynamic light scattering, of 6.2. The thus-formed silica sol was dried in a vacuum drier at 80° C., to thereby form a silica gel, which was then pulverized with a mortar and further dried at 180° C. for 3 hours, to thereby form a silica powder. The thus-obtained silica powder was found to have an α-ray emission rate of 0.03 counts/cm$^2$·hr and a moisture absorption coefficient, as determined after allowing the silica powder to stand for 48 hours at 23° C. and a relative humidity of 50 RH %, of 0.1 mass %.

Comparative Example 8

A commercial nano-size fumed silica powder (Aerosil (registered trademark) 130, mean primary particle size: 21 nm, product of Nippon Aerosil Co., Ltd.) was provided. The silica powder (50 g) was fed to a fiber mixer (MX-X53: product of Panasonic) and pulverized for 5 minutes. Separately, pure water (200 g) was placed in a 1 L beaker, and the above-pulverized silica powder (50 g) was added to the beaker. The silica powder was ultrasonicated for 2 hours by means of an ultrasonic washer (W-222, product of Honda Electronics Co., Ltd.), to thereby yield a water-dispersion silica sol. Similar to Comparative Example 7, the thus-obtained water-dispersion silica sol (250 g) was subjected to the procedure of steps (j) and (k) of Example 1. The thus-formed sol was found to have an SiO$_2$ concentration of 15.5 mass %, a water content of 0.1 mass %, a methanol content of 0.3 mass %, a mean primary particle size of 21 nm, a silica particle size, as determined through dynamic light scattering, of 150 nm, and a silica particle size/mean primary particle size ratio, as determined through dynamic light scattering, of 7.1. The thus-formed silica sol was dried in a vacuum drier at 80° C., to thereby form a silica gel, which was then pulverized with a mortar and further dried at 180° C. for 3 hours, to thereby form a silica powder. The thus-obtained silica powder was found to have an α-ray emission rate less than 0.001 counts/cm²·hr and a moisture absorption coefficient, as determined after allowing the silica powder to stand for 48 hours at 23° C. and a relative humidity of 50 RH %, lower than 0.1 mass %.

Comparative Example 9

The methyl ethyl ketone-dispersion silica sol (100 g) produced in Comparative Example 3 was subjected to the procedure of Example 6, to thereby yield an alicyclic epoxy resin monomer-dispersion silica sol. The thus-obtained silica sol was found to have a B-type viscosity of 4,500 mPa·s, measured at an $SiO_2$ concentration of 45.4 mass %, a methyl ethyl ketone content lower than 0.1 mass %, and 23° C.

Comparative Example 10

The methyl ethyl ketone-dispersion silica sol (100 g) produced in Comparative Example 4 was subjected to the procedure of Example 6, to thereby yield an alicyclic epoxy resin monomer-dispersion silica sol. The thus-obtained silica sol was found to have a B-type viscosity of 1,800 mPa·s, measured at an $SiO_2$ concentration of 45.4 mass %, a methyl ethyl ketone content lower than 0.1 mass %, and 23° C.

Comparative Example 11

The methyl ethyl ketone-dispersion silica sol (100 g) produced in Comparative Example 5 was subjected to the procedure of Example 6, to thereby yield an alicyclic epoxy resin monomer-dispersion silica sol. The thus-obtained silica sol was found to have a B-type viscosity of 5,000 mPa·s, measured at an $SiO_2$ concentration of 45.4 mass %, a methyl ethyl ketone content lower than 0.1 mass %, and 23° C.

Comparative Example 12

The methyl ethyl ketone-dispersion silica sol (100 g) produced in Comparative Example 6 was subjected to the procedure of Example 6, to thereby yield an alicyclic epoxy resin monomer-dispersion silica sol. The thus-obtained silica sol was found to have a B-type viscosity of 4,800 mPa·s, measured at an $SiO_2$ concentration of 45.4 mass %, a methyl ethyl ketone content lower than 0.1 mass %, and 23° C.

Comparative Example 13

The methyl ethyl ketone-dispersion silica sol (100 g) produced in Comparative Example 7 was mixed with an alicyclic epoxy resin monomer (Celloxide 2021P: product of Daicel Corporation) (35 g), and the mixture was subjected to solvent removal by means of a rotary evaporator under a reduced pressure of 200 to 10 Torr at a bath temperature of 100° C. During solvent removal, the viscosity of the mixture drastically rose, to thereby loose flowability. At a point of time of loss of flowability, the residual methyl ethyl ketone content was 3 mass %.

Comparative Example 14

The methyl ethyl ketone-dispersion silica sol (100 g) produced in Comparative Example 7 was mixed with a bisphenol F epoxy resin (YL-983U, product of Mitsubishi Chemical Corporation) (35 g), and the mixture was subjected to solvent removal by means of a rotary evaporator. During solvent removal, the viscosity of the mixture drastically rose, to thereby loose flowability. At a point of time of loss of flowability, the residual methyl ethyl ketone content was 6 mass %.

Comparative Example 15

The methyl ethyl ketone-dispersion silica sol (100 g) produced in Comparative Example 8 was mixed with an alicyclic epoxy resin monomer (Celloxide 2021P: product of Daicel Corporation) (35 g), and the mixture was subjected to solvent removal by means of a rotary evaporator under a reduced pressure of 200 to 10 Torr at a bath temperature of 100° C. During solvent removal, the viscosity of the mixture drastically rose, to thereby loose flowability. At a point of time of loss of flowability, the residual methyl ethyl ketone content was 2 mass %.

Comparative Example 16

The methyl ethyl ketone-dispersion silica sol (100 g) produced in Comparative Example 8 was mixed with a bisphenol F epoxy resin (YL-983U, product of Mitsubishi Chemical Corporation) (35 g), and the mixture was subjected to solvent removal by means of a rotary evaporator. During solvent removal, the viscosity of the mixture drastically rose, to thereby loose flowability. At a point of time of loss of flowability, the residual methyl ethyl ketone content was 5 mass %.

Production of Cured Epoxy Products

Each of the alicyclic epoxy resin monomer-dispersion silica sols and bisphenol F epoxy resin monomer-dispersion silica sols described in Examples 6 to 11 and Comparative Examples 9 to 12 was processed to form a cured epoxy product. Physical properties thereof were assessed.

Example 12

To a 300-mL four-neck flask, the alicyclic epoxy resin monomer-dispersion silica sol produced in Example 6 (40.5 g) and methylhexahydrophthalic anhydride (26.5 g) were added and mixed together at 80° C. for 40 minutes, to thereby form a mixture. Subsequently, tetrabutylphosphonium O,O'-diethyldithiophosphate (Hishicolin (registered trademark) PX-4ET, product of Nippon Chemical Industrial Co., Ltd.) (222 mg) serving as a curing accelerator was added to the mixture, and the resultant mixture was stirred for 10 minutes, followed by defoaming for 2 minutes under reduced pressure, to thereby yield a silica-containing epoxy resin composition to be cured. No residual organic solvent was detected in the obtained silica-containing epoxy resin composition to be cured. The silica-containing epoxy resin composition to be cured was poured into a molding plate (i.e., two glass plates treated with a releasing agent SR-2410 (product of Dow Corning Toray), disposed with a distance of 3 mm) and heated at 90° C. for 2 hours, then at 150° C. for 1 hour, to thereby yield a silica-containing epoxy resin cured product.

Example 13

The procedure of Example 12 was repeated, except that the alicyclic epoxy resin monomer-dispersion silica sol was changed to the bisphenol F epoxy resin monomer-dispersion silica sol obtained in Example 7, and methylhexahydrophthalic anhydride (22.3 g) was used, to thereby yield a silica-containing epoxy resin cured product.

Examples 14 to 16

The procedure of Example 12 was repeated, except that any of the alicyclic epoxy resin monomer-dispersion silica sols obtained in Examples 8 to 10 was used, to thereby yield respective silica-containing epoxy resin cured products.

Example 17

The procedure of Example 12 was repeated, except that the alicyclic epoxy resin monomer-dispersion silica sol (31.8 g) obtained in Example 11 was used, to thereby yield a silica-containing epoxy resin cured product.

Comparative Examples 17 to 20

The procedure of Example 12 was repeated, except that any of the alicyclic epoxy resin monomer-dispersion silica sols obtained in Comparative Examples 9 to 12 was used as a silica sol, to thereby yield respective silica-containing epoxy resin cured products.

Comparative Example 21

An alicyclic epoxy resin monomer (Celloxide 2021P: product of Daicel Corporation) (22.8 g) and methylhexahydrophthalic anhydride (27.4 g) were mixed together at 80° C. for 40 minutes, to thereby form a mixture. Subsequently, tetrabutylphosphonium O,O'-diethyldithiophosphate (Hishicolin (registered trademark) PX-4ET, product of Nippon Chemical Industrial Co., Ltd.) (222 mg) serving as a curing accelerator was added to the mixture, and the resultant mixture was stirred for 10 minutes, followed by defoaming for 2 minutes under reduced pressure, to thereby yield an epoxy resin composition to be cured. The thus-obtained epoxy resin composition to be cured was poured into a molding plate (i.e., two glass plates treated with a releasing agent SR-2410 (product of Dow Corning Toray), disposed with a distance of 3 mm) and heated at 90° C. for 2 hours, then at 150° C. for 1 hour, to thereby yield an epoxy resin cured product containing no silica particles.

Comparative Example 22

A bisphenol F epoxy resin monomer (22.8 g) and methylhexahydrophthalic anhydride (22.8 g) were mixed together at 80° C. for 40 minutes, to thereby form a mixture. Subsequently, tetrabutylphosphonium O,O'-diethyldithiophosphate (Hishicolin (registered trademark) PX-4ET, product of Nippon Chemical Industrial Co., Ltd.) (222 mg) serving as a curing accelerator was added to the mixture, and the resultant mixture was stirred for 10 minutes, followed by defoaming for 2 minutes under reduced pressure, to thereby yield an epoxy resin composition to be cured. The thus-obtained epoxy resin composition to be cured was poured into a molding plate (i.e., two glass plates treated with a releasing agent SR-2410 (product of Dow Corning Toray), disposed with a distance of 3 mm) and heated at 90° C. for 2 hours, then at 150° C. for 1 hour, to thereby yield an epoxy resin cured product containing no silica particles.

Physical Properties of Cured Epoxy Products

Each of the produced silica-containing epoxy resin cured products was assessed in terms of 3-point bending strength, transmittance, coefficient of linear expansion, and percent boiling water absorption.

3-Point Bending Strength Test

The bending strength was measured by means of a bending tester according to JIS K-6911. Firstly, the height and width of each test piece was measured. The test piece was set in a tester, and a load was applied to the center of the piece with a pressure wedge. The load at which the test piece was bent was recorded, to thereby calculate bending strength ($\sigma$) by the following equation:

$$\text{Bending strength } \sigma \text{ (MPa)}\{kgf/mm^2\}=(3PL)/(2Wh^2)$$

(wherein P represents a load at which the test piece was bent (N) {kgf}, L represents an interfulcrum distance (mm), W represents a test piece width, and h represents a test piece height (mm)).

Bending elastic modulus was calculated by the following equation:

$$\text{Bending elastic modulus } (E) \text{ (MPa)}\{kgf/mm^2\}=[L^3/(4Wh^3)]\times[F/Y]$$

(wherein F/Y represents a slope of a linear portion of the load-deflection curve (N/mm) {kgf/mm}).

Transmittance

Transmittance was measured within a range of 200 to 800 nm by means of a spectrophotometer (model: UV-3600, product of Shimadzu Corporation).

Coefficient of Linear Expansion

Coefficient of linear expansion was measured according to JIS K-6911. The thickness of each test piece was precisely measured. Then, a load (0.05 N) was applied to the test piece, which was heated at a temperature elevation rate of 1° C./minute for thermal mechanical analysis (TMA). Coefficient of linear expansion was determined by the following equation:

$$\Delta L1/L\times 50=\text{coefficient linear expansion } \alpha_1$$

(wherein $\Delta L1$ represents a change in length of test piece in a temperature range of 30 to 80° C., and L represents an initial length of the specimen).

Percent Boiling Water Absorption

Boiling water absorption was measured according to JIS K-6911. Specifically, a test piece was dried for 24 hours in a thermostatic bath maintained at 50° C. under air. The thus-dried test piece was cooled in a desiccator to 20° C., and the weight of the test piece was measured. The thus-dried test piece was placed in boiling distilled water at 100° C. for 100 hours. The piece was taken up from water and cooled for 30 minutes with a flow of water at 20° C. Water of the test piece was wiped off and, immediately thereafter, the weight of the test piece after water absorption was measured. Percent water absorption was calculated by the following formula:

$$\text{Percent boiling water absorption } A \text{ (\%)}=[(W_2-W_1)/W_1]\times 100$$

(wherein $W_1$ represents weight (g) of the test piece before boiling treatment, and $W_2$ represents weight (g) of the test piece after boiling treatment).

The cured epoxy resin products of Examples 12 to 17 exhibited lower percent boiling water absorption, as compared with the silica-free cured products of Comparative Examples 21 and 22. The cured epoxy resin products of Comparative Examples 17 to 20 exhibited lower percent boiling water absorption, as compared with the silica-free cured product of Comparative Example 21.

All of the silica powders produced by drying the silica sols of Examples 1 to 5 exhibited an α-ray emission rate of ≤0.005 counts/cm²·hr and a moisture absorption coefficient, as determined after allowing the silica powder to stand for 48 hours at 23° C. and a relative humidity of 50 RH %, of 0.5 mass % or lower. These two parameters are very low.

In contrast, the silica powders produced by drying the silica sols of Comparative Examples 1, 3, and 4 exhibited high moisture absorption coefficients, as determined after allowing the silica powder to stand for 48 hours at 23° C. and a relative humidity of 50 RH %. Thus, the comparative silica powders do not have low moisture absorption coefficient. The silica powder produced by drying the silica sol of Comparative Example 2 exhibited a moisture absorption coefficient, as determined after allowing the silica powder to stand for 48 hours at 23° C. and a relative humidity of 50 RH %, of 0.5 mass % or lower. However, the silica powder exhibited an α-ray emission rate as high as 0.025 counts/cm²·hr. The silica powders produced by drying the silica sols of Comparative Examples 4 and 5 exhibited low α-ray emission rate. However, the moisture absorption coefficients, as determined after allowing the silica powder to stand for 48 hours at 23° C. and a relative humidity of 50 RH %, were as considerably high as 6.2 and 4.9 mass %, indicating unfavorably high moisture absorption.

TABLE 1

|  | Moisture-absorption coeff. (mass %) | α-Ray emission (count/cm² · hr) |
| --- | --- | --- |
| Ex. 1 | 0.1 | 0.002 |
| Ex. 2 | 0.3 | 0.002 |
| Ex. 3 | 0.1 | 0.002 |
| Ex. 4 | 0.1 | 0.002 |
| Ex. 5 | <0.1 | 0.002 |
| Comp. Ex. 1 | 1.7 | 0.027 |
| Comp. Ex. 2 | 0.1 | 0.025 |
| Comp. Ex. 3 | 1.7 | 0.002 |
| Comp. Ex. 4 | 0.9 | 0.002 |
| Comp. Ex. 5 | 6.2 | <0.001 |
| Comp. Ex. 6 | 4.9 | <0.001 |
| Comp. Ex. 7 | <0.1 | 0.03 |
| Comp. Ex. 8 | <0.1 | <0.001 |

TABLE 2

|  | Silica sol | SiO₂ concn. (mass %) | Viscosity (23° C.) (mPa · s) |
| --- | --- | --- | --- |
| Ex. 6 | Ex. 1 | 45.4 | 1050 |
| Ex. 7 | Ex. 1 | 45.4 | 2500(*) |
| Ex. 8 | Ex. 2 | 45.4 | 1500 |
| Ex. 9 | Ex. 3 | 45.4 | 1200 |
| Ex. 10 | Ex. 4 | 45.4 | 1100 |
| Ex. 11 | Ex. 5 | 30.0 | 1200 |
| Comp. Ex. 9 | Comp. Ex. 3 | 45.4 | 4500 |
| Comp. Ex. 10 | Comp. Ex. 4 | 45.4 | 5000 |
| Comp. Ex. 11 | Comp. Ex. 5 | 45.4 | 4800 |
| Comp. Ex. 12 | Comp. Ex. 6 | 30.0 | Flowability loss |
| Comp. Ex. 13 | Comp. Ex. 7 | 30.0 | Flowability loss |
| Comp. Ex. 14 | Comp. Ex. 7 | 30.0 | Flowability loss |
| Comp. Ex. 15 | Comp. Ex. 8 | 30.0 | Flowability loss |
| Comp. Ex. 16 | Comp. Ex. 8 | 30.0 | Flowability loss |

(*)Viscosity at 50° C.

TABLE 3

|  | Silica sol | Coefficient of linear expansion α₁ (ppm) | Flexural strength (MPa) | Transmittance (%) | Boiling water absorption (mass %) |
| --- | --- | --- | --- | --- | --- |
| Ex. 12 | Ex. 6 | 61 | 114 | 81 | 2.1 |
| Ex. 13 | Ex. 7 | 52 | 165 | 61 | 0.7 |
| Ex. 14 | Ex. 8 | 60 | 115 | 90 | 2.3 |
| Ex. 15 | Ex. 9 | 59 | 158 | 80 | 2.0 |
| Ex. 16 | Ex. 10 | 62 | 118 | 83 | 2.5 |
| Ex. 17 | Ex. 11 | 67 | 113 | 75 | 2.7 |
| Comp. Ex. 17 | Comp. Ex. 9 | 61 | 108 | 91 | 3.9 |
| Comp. Ex. 18 | Comp. Ex. 10 | 61 | 109 | 85 | 3.3 |
| Comp. Ex. 19 | Comp. Ex. 11 | 61 | 114 | 76 | 5.4 |
| Comp. Ex. 20 | Comp. Ex. 12 | 61 | 111 | 73 | 4.5 |
| Comp. Ex. 21 | — | 75 | 113 | 94 | 3.1 |
| Comp. Ex. 22 | — | 72 | 153 | 93 | 1.2 |

INDUSTRIAL APPLICABILITY

The silica sol of the present invention contains nano-size silica particles having a very low α-ray emission rate and a small moisture absorption coefficient. The silica sol is suitably used for wiring substrates for semiconductor packages and semiconductor sealing materials.

The invention claimed is:

1. A silica sol comprising silica particles dispersed in a dispersion medium, the silica particles being surface-treated with an organic silane compound and having:
   a mean primary particle size of 20 to 100 nm when the mean primary particle size (nm) is calculated as 2720/specific surface area (m²/g) where the specific surface area is determined for silica powder obtained by drying the silica particles through a nitrogen adsorption method;
   a silica particle size/mean primary particle size ratio of 1.0 to 3.0 when the silica particle size is determined through a dynamic light scattering method;
   an α-ray emission rate of 0.005 counts/cm² hr or less; and
   a moisture absorption coefficient, determined after allowing the silica particles to stand for 48 hours at 23° C. and a relative humidity of 50 RH %, of 0.5 mass % or lower.

2. The silica sol according to claim 1, wherein the organic silane compound has an epoxy group.

3. The silica sol according to claim 1, wherein the silica particles have been heated in water at 200 to 350° C.

4. The silica sol according to claim 1, wherein the silica particles are produced from an active silicic acid as a starting material which is prepared through cation exchange of aqueous alkali silicate.

5. The silica sol according to claim 1, wherein the silica particles are produced from a high-purity active silicic acid as a starting material, the high-purity active silicic acid being prepared by adding a strong acid to an active silicic acid which has been prepared through cation exchange of aqueous alkali silicate, and subjecting the product to cation exchange and anion exchange.

6. The silica sol according to claim 1, wherein the silica particles are produced from a high-purity active silicic acid as a starting material, the high-purity active silicic acid being prepared by adding a strong acid or a strong acid salt to aqueous alkali silicate, subjecting the product to cation exchange to thereby form an active silicic acid, and subjecting the active silicic acid to cation exchange and anion exchange.

7. The silica sol according to claim 1, wherein the dispersion medium is an organic solvent.

8. The silica sol according to claim 1, wherein the dispersion medium is a resin monomer.

9. The silica sol according to claim 8, wherein the resin monomer is an epoxy resin monomer.

10. A silica powder which is produced by removing the dispersion medium from the silica sol according to claim 1.

11. A silica-containing epoxy resin composition comprising the silica powder according to claim 10, an epoxy resin monomer, and an epoxy resin-curing agent.

12. A silica-containing epoxy resin composition which is produced by removing an organic solvent from the silica-containing epoxy resin composition according to claim 11, wherein the epoxy resin-curing agent included the organic solvent.

13. A silica-containing epoxy resin composition comprising the silica sol according to claim 1, an epoxy resin monomer, and an epoxy resin-curing agent.

14. A silica-containing epoxy resin composition which is produced by removing an organic solvent from the silica-containing epoxy resin composition according to claim 13, wherein the epoxy resin-curing agent included the organic solvent.

15. The silica-containing epoxy resin composition according to claim 14, which has a silica content of 10 to 90 mass %.

16. A silica-containing epoxy resin cured product which is produced by curing the silica-containing epoxy resin composition according to claim 15.

17. A silica-containing epoxy resin cured product which is produced by curing the silica-containing epoxy resin composition according to claim 14.

18. The silica-containing epoxy resin composition according to claim 13, which has a silica content of 10 to 90 mass %.

19. A silica-containing epoxy resin cured product which is produced by curing the silica-containing epoxy resin composition according to claim 13.

* * * * *